Sept. 10, 1963     A. D. ROBINSON     3,103,481
ELECTROLYTIC CELL
Filed July 14, 1959     2 Sheets-Sheet 1
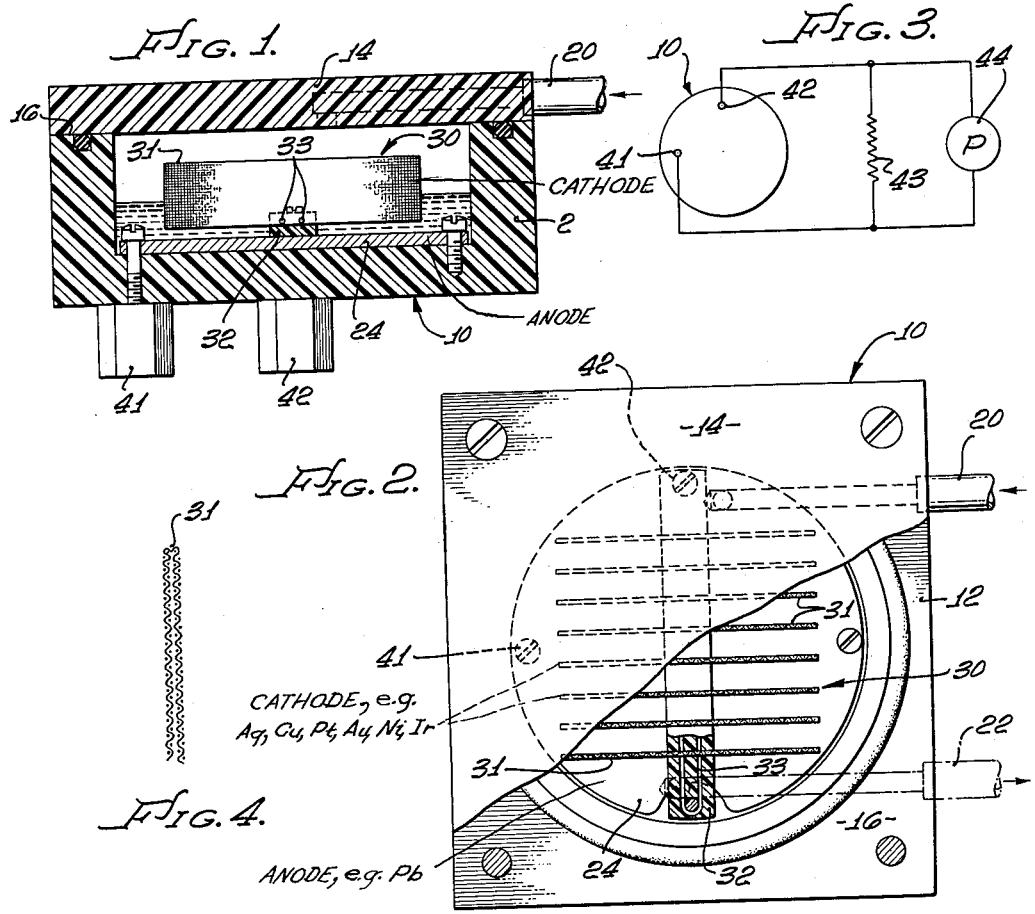
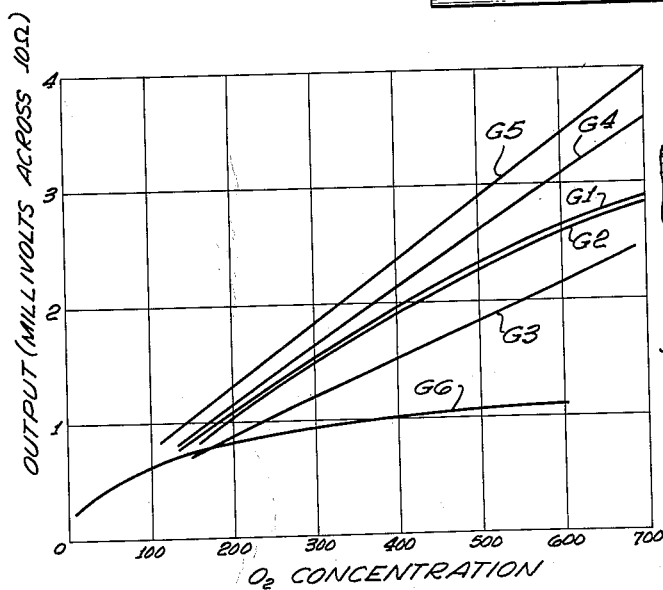
INVENTOR.
ALFRED D. ROBINSON
BY
Reed Lawlor
ATTORNEY.

United States Patent Office 3,103,481
Patented Sept. 10, 1963

3,103,481
ELECTROLYTIC CELL
Alfred D. Robinson, El Monte, Calif., assignor to Research Instrument Corporation, Pasadena, Calif., a corporation of California
Filed July 14, 1959, Ser. No. 827,107
13 Claims. (Cl. 204—195)

This invention relates to improvements in electrochemical gas analyzers, especially such analyzers that are employed for detecting and measuring the concentrations of oxygen in the presence of other gases, and also to electrodes and methods of manufacturing electrodes for use in such analyzers.

Since devices embodying this invention find their greatest use in measuring concentrations of oxygen, the invention will be described with particular reference to this use, though it will be understood that it may be modified to adapt it for measurements of concentrations of other gases.

In the past, a number of such electrochemical analyzers have been developed in which a cathode is supported on a porous cylindrical body such as porous porcelain, filter paper, asbestos sheets, and the like, and an anode is mounted internally of the porous tubular member or at a remote point. In such devices, various means have been employed to maintain the porous body wet with electrolyte so that the electrolyte forms a film in contact with the outer electrode. In another type of device, the cathode is mounted with its lower end immersed in the main surface of a body of electrolyte. In such devices, oxygen that diffuses into the electrolyte adjacent the cathode is converted into ions which then flow through the main body of the electrolyte to the anode.

In various such arrangements, the electrical action developed is a measure of the concentration of a particular gas component present in the gas mixture to which the cathode is exposed. Electrochemical analyzers that operate on such principles are disclosed, for example, in Patent No. 2,278,248, which issued to William A. Darrah, March 31, 1952; Patent No. 2,651,612, which issued to John F. Haller, September 8, 1953; and Patent No. 2,805,191, which issued to Paul Hersch, September 3, 1957; and in my copending patent application Serial No. 727,439, filed April 9, 1958, now U.S. Patent No. 2,992,170.

In my copending patent application, an improved electrochemical cell is disclosed in which the lower end of a screen immersed in a body of electrolyte serves as the cathode, but in which the entire surface of the screen is submerged in electrolyte, due to capillary action of the screen. As pointed out in that application, a greater reproducibility of results and an extended range of linearity is obtained by maintaining the entire cathode covered with a film of electrolyte. In that device, the range of linearity is extended by maintaining the film thick so as to permit ions formed by the reaction of oxygen and electrolyte to flow freely in the electrolyte and without saturation of the ion current at any point of the ion path that is spaced from the cathode. Furthermore, in that device, the liquid film is maintained in liquid communication with the body of mother electrolyte by means of liquid flow channels so that the ions can flow readily from the film to the mother electrolyte without being obstructed by liquid flow barriers, such as would be present if the film were very thin or if the electrolyte was required to flow through a porous body on which the cathode is mounted.

The present invention relates particularly to an improved cathode which possesses liquid flow channels over substantially its entire area which effectively increase the average thickness of the film cross-section and which, therefore, permit the flow of even larger ion currents than heretofore. While the invention is also useful where part of the cathode is free of electrolyte, as in the Hersch analyzer, its greatest utility is found in a cell in which the entire cathode is covered by electrolyte, as in copending application Serial No. 727,439, now U.S. Patent No. 2,992,170.

In the best embodiment of this invention found to date, a cathode is employed that has a reticulated surface. Such a surface consists of a pattern of protuberances that are surrounded by valleys which form a network of channels extending in all directions. Though the reticulated surface may be formed in other ways, etching, especially electrochemical etching, of the surface of the cathode has been found to be very effective. With such a cathode, the electrolyte covers the protuberances and fills the channels between them, thus effectively increasing the thickness of the film and making it possible for the film to carry a larger ion current than if the surface were smooth or polished.

The invention also involves treatment of the cathode to render the cathode hydrophilic, that is, easily wettable by the aqueous electrolyte, so as to avoid the formation of areas that are free of electrolyte. By utilizing such a combined etching and cleaning process, a cathode is thus formed which is linear over a wider range than in electrochemical gas analyzer cells heretofore available and which, in certain instances, are more sensitive than such analyzers that have been available heretofore.

The foregoing and other advantages and features of this invention will become more readily apparent from a consideration of a number of embodiments of the invention which are described below, taken in connection with the accompanying drawings, in which:

FIGURE 1 is a sectional view of an electrochemical cell embodying features of this invention;

FIG. 2 is a top plan view of the electrochemical cell of FIG. 1;

FIG. 3 is a schematic diagram of the analyzer, showing the circuit employed;

FIG. 4 shows a cross-section of the cathode of FIGS. 1 and 2 in greater detail;

FIG. 5 is an enlarged detail drawing of a fragment of a cathode filament showing the etched surface;

FIG. 6 is a graph illustrating results obtained in various tests during the course of development of this invention;

Figure 8:
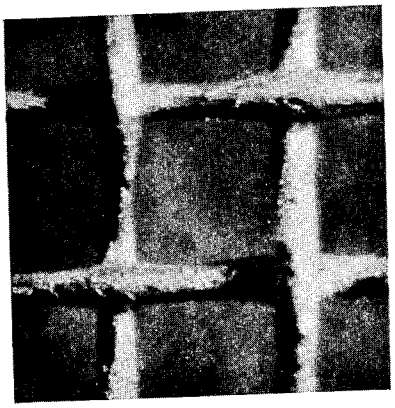
Figure 9:
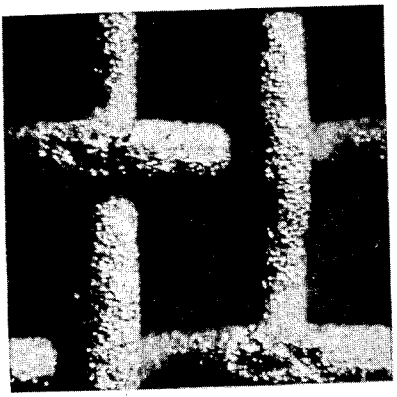
Figure 10:
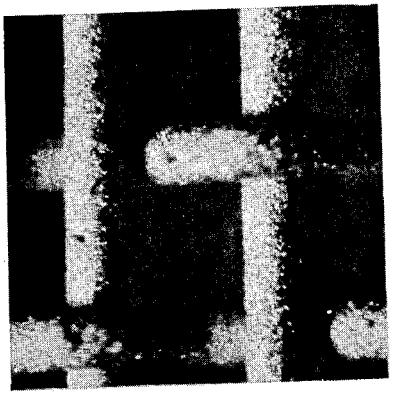
Figure 11:
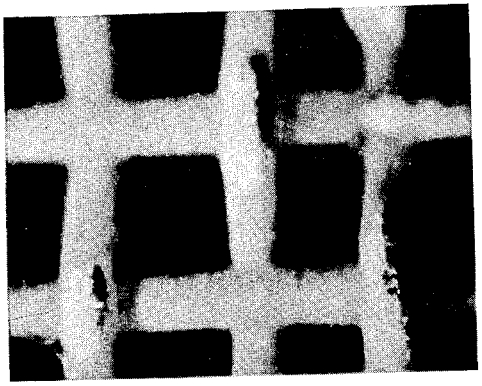

FIGS. 8 to 10 inclusive are photomicrographs of parts of reticulated cathodes; and FIG. 11 is a photomicrograph of a reticulated cathode bearing a thin film of oil and only partly submerged in electrolyte.

In the drawings, and particularly in FIGS. 1 and 2, there is illustrated an analyzing or test cell embodying this invention. The cell 10 comprises a vessel 12 capped by a cover plate 14 sealingly attached to the upper edge 16 thereof. Adit and exit tubes, or pipes, 20 and 22 respectively mounted in the upper walls of the vessel are employed for flowing a gas under test through the compartment within the cell.

The cell 10 includes a cathode structure 30 that is located directly above the anode. The cathode structure of this analyzing cell is in the form of a plurality of cathode elements 31 inserted in slots of a supporting bar 32 and held in place by a common U-shaped bridging conductor 33. Each of the cathode elements 31 comprises a strip of silver-wire screen that is folded onto itself longitudinally to form a two-layer strip of double thickness, as indicated particularly in FIG. 4. To hold the cathode elements in place and to provide a common electrical connection for them, they are pierced near their lower edges by the U-shaped bridging conductor 33. The cell 10 also includes an anode 25 that is fastened to the bottom wall or floor of the vessel 12. An electrical terminal 41 is connected to the anode 24 and an electrical terminal 42 is connected to the cathode through bridging conductor 33. Both terminals 41 and 42 project through the floor of the vessel.

The cathode structure 30 is arranged with the lower edges of the cathode elements 31 lying in a common plane parallel to the lower flat wall of the vessel. In order to prepare the cell for use, a volume of electrolyte such as an aqueous solution of potassium hydroxide (KOH) is placed in the vessel 12 in an amount sufficient to cover the lowermost edges of the cathode elements 31 with electrolyte. The electrolyte is introduced through the opening at the top of the vessel while the cover 16 is removed. The cathode elements extend about 1 cm. above the main surface of the electrolyte, that is, to a height which permits the entire cathode to be submerged in electrolyte due to capillary action. In this condition, the cross bar 32, the bridging conductor 33, and the anode 24 are completely covered with electrolyte.

In the best embodiment of the invention, the space between the two parts of the screen is filled with electrolyte and the remaining outer parts of the screen are covered by a film of electrolyte. In accordance with this invention, the reticulation of the filaments of the screen increases the average thickness of the film. Since the anode may be at a remote point, the cathode and cell may be considered a half cell, especially when containing electrolyte.

The terminals 41 and 42 are connected across a calibrated resistor 43 as shown in FIG. 3. When the cell is in operating condition, current flows through the resistor 43 in an amount that depends upon the partial pressure of oxygen present in the cell. A potentiometer 44 connected across the resistor 43 is employed to measure the current. The potentiometer is preferably of the recording type, such as a self-balancing recording potentiometer which employs a pen for writing an inked trace on a circular sheet of recording paper that is rotated at uniform speed by a clock motor.

When the cell is in proper operating condition and connected to the resistor 42 and potentiometer 44, the adit 20 is connected by means of suitable tubulation or piping to the source of gas that is under investigation. This source of gas may be a sealed container or it may be part of the system through which gas to be analyzed is flowing. At any rate, a valve (not shown) connected in the line between the adit 20 and the gas source is open to a degree sufficient to cause gas to flow through the test cell at a suitable regulated speed.

If the test gas flowing through the cell contains oxygen, some of the oxygen diffuses through the electrolyte film to the cathode and there reacts catalytically with the electrolyte, causing an electric current to flow between the cathode and the anode. This current flows through the calibrated resistor 42, thereby producing a voltage across this resistor which corresponds to the partial pressure of the oxygen present in the test gas, or, in other words, to the concentration of oxygen in the test gas.

At the cathode, the oxygen diffusing through the film is converted to hydroxyl ions (OH$^-$). The ions so formed migrate through the electrolyte to the anode carrying electrons from the cathode through the electrolyte to the anode. As a result of this process, a positive current flows from the cathode through the external resistance 43 to the anode in an amount proportional to the partial pressure of the oxygen.

In this particular case, the catalytic action of the electrode may be described by the following two equations:

$$O_2 + 2Ag \rightarrow 2AgO$$
$$2e^- + AgO + H_2O \rightarrow Ag + 2OH^-$$

In order to prevent the liberation of hydrogen at the anode, the anode is composed of a material such as lead, antimony, or cadmium.

As explained in my copending patent application, the current produced by the cell when a sample containing a fixed percentage of oxygen flows through the cell is rendered more accurately reproducible and below saturation over a wider range if the entire surface of the cathode is acting catalytically while the measurement is being made. This catalytic activity is achieved by maintaining the entire cathode visibly wet, and by maintaining the thickness of the film sufficiently great to permit ions that are formed at all parts of the cathode surface to flow freely to the mother electrolyte beneath the cathode.

As explained in my prior patent application, the operating range of the cell is greatly increased by employing unobstructed liquid flow channels between the film and the mother electrolyte. This result is there accomplished in part by maintaining the height of that part of the cathode which projects above the upper surface of the body of electrolyte sufficiently small to maintain the entire cathode covered by electrolyte by virtue of capillary attraction of the cathode and the electrolyte.

In the best cells that have been made to date in accordance with this invention, the cathode is reticulated by etching, producing a surface of mammillary or pebbly appearance. In certain cases to be described, the mammillary surface is characterized by a somewhat random distribution of separate protuberances in the form of discrete microscopic mounds. Such a surface is rough, rather than smooth. It is matted or dull, rather than polished. In the case of a silver-screen cathode, the mat finish as viewed under a microscope, consists of a series of microscopic protrusions, or protuberances, separated by a network of channels. The peak-to-peak spacing of such protrusions in cathodes which have proved to be very satisfactory, lies between about 0.3 and 0.45 mil, although I have determined that, in general, a spacing of between about 0.1 and about 0.6 mil gives satisfactory results. Such spacing represents not only the spacing between the protrusions, but also defines, in effect, the dimensions and spacing of the channels, since the channels are about half as wide and about half as deep as the spacing between protrusions. A part of the surface of such a cathode with electrolyte in place is shown in FIG. 5, while photomicrographs of parts of such cathodes free of electrolyte are shown in FIGS. 8 to 10, and a part of a cathode partially submerged in electrolyte is shown in FIG. 11.

Though the reticulation described herein has been produced by etching and though electro-etching has been most effective, it will be understood that the reticulation may be produced in other ways, such as by embossing, sandblasting, metal spraying, metal plating, or even by depositing granules of inert material on the metal cathode surface. The reticulation may be very irregular and not characterized by any pattern at all, or it may be somewhat regular.

When employing a reticulated cathode, the electrolyte, due to its surface tension, not only coats the outer part of the cathode with a film of electrolyte, but fills or almost fills the valleys between the protrusions as indicated in FIG. 5. In this way, a film is formed that has a greater average thickness than could otherwise be formed by the film, itself, at the outer portion of a smooth cathode. By virtue of the fact that such a very thick film is formed, the electrolytic cell employing such a cathode possesses a greater degree of linearity than an otherwise identical cell employing a cathode having a smooth, or polished, finish. Comparative results obtained with cells employing cathodes prepared in different ways are described below.

In all of the examples described below, the cathode employed eight cathode elements 31 in the form of a two-sheet silver screen. Each of the cathode elements was one-half inch (½") high and two inches (2") long. The screen was —80 mesh and the wire forming the screen was composed of fine silver and had a diameter of 4.5 mils. All of the screens were formed by folding and then pressing the two folded parts together in an arbor press to decrease the volume of the space between the folds. The pressure was applied by squeezing the screen folds together while held between two soft pads, each consisting of a sheet of filter paper and sandwiched between sheets of aluminum. The use of soft material, as filter paper, in direct contact with the screen, prevents the forming of any sharp edges or flat areas on the outer surfaces of the wire and other damage to the screen, when the screen is subjected to high pressure. By reducing the space between the two sides of the screen to a low value, a minimum volume of liquid is supported between the folds while the cathode is in use. This reduces the time required for oxygen dissolved in the electrolyte at the cathode to reach its equilibrium concentration. This also minimizes the weight of the liquid that pulls against the surface tension that supports the film in place on the outer sides of the cathode.

Comparative results obtained with screens differently treated are illustrated in the graphs of FIG. 6. In these graphs, abscissae represent oxygen concentration in an inert gas expressed in parts per million, while ordinates represent the potential measured across a 10-ohm resistor 43, expressed in millivolts. The calibrating mixtures were made up by adding small quantities of oxygen to an inert carrier gas such as nitrogen. The fact that the graphs, if projected, would intercept the abscissae axis to the left of the zero point indicates that some oxygen was present in the carrier gas to which the known quantities of pure oxygen were added to form the calibrating mixtures.

EXAMPLE 1

Figure 7:
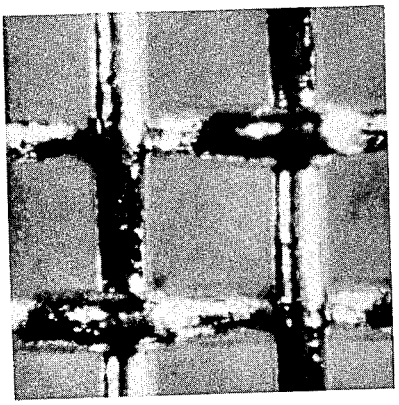
FIG. 7 is a photomicrograph of part of a non-reticulated cathode.

The cathode elements of this example were not etched. These cathodes were made from non-reticulated silver-wire screen as described above, and the screen was cleaned by heating, dipping in a weak acid, and then rinsing in conductivity water. The screen so treated had a bright surface. When viewed under a 300-power microscope, the wire had a smooth appearance except for drawing or die marks. FIG. 7 is a photomicrograph of part of such a screen.

The results obtained with such a cathode are represented by graph G1 of FIGS. 6. It is interesting to note that a significant degree of non-linearity appears at an oxygen concentration of only about 500 parts per million. The results obtained with non-reticulated screens vary widely from one cell to another and from time to time, depending very largely on the history of the screen and especially on the cleaning process used. Furthermore, such cells are often characterized by substantial "hysteresis."

EXAMPLE 2

In this case, the cathode elements were heated, electropolished with concentrated sulphuric acid, and then rinsed in conductivity water. The electropolishing was carried out with a current of about 20 amps. for a period of 30 seconds at a temperature of 70° F. The screen so formed had a highly polished or bright surface. Under 300-power magnification, the surface appeared extremely smooth and brilliant.

The results obtained with such a cathode are illustrated in graph G2 of FIG. 6.

It is to be noted that there is little difference in results obtained with the cathodes of Examples 1 and 2. Even the non-linearity characteristics were about the same, as indicated by the similarity of curvature of the two graphs G1 and G2. In other cases, however, the similarity was not so striking, since a non-polished non-reticulated screen does not produce uniform results.

EXAMPLE 3

In this case, the screen was first heated, then it was chemically etched in a bath of 15% nitric acid and then cleaned by rinsing with conductivity water. The surface of this screen was no longer bright, but was matted or dull.

When examined under a microscope, it was noted that the screen was finely etched, the surface appearing frosty, rather than bright or polished. A microphotograph of part of such a screen is shown in FIG. 8. The protuberance spacing in this case (which could be seen with a 300-power microscope) is less than about 0.05 mil.

The results obtained with a cell employing this type of cathode are represented by graph G3 of FIG. 6. Here, it will be noted that the sensitivity is less than in the case of Examples 1 and 2 over the range indicated, but that the linearity is greatly improved. At high oxygen concentrations (beyond the range shown in the graph), this cell is more sensitive than those of Examples 1 and 2.

EXAMPLE 4

In this case, the cathode elements were heated, electro-etched, and then cleaned. The electro-etching was performed by means of a solution composed of equal parts of concentrated sulphuric acid, concentrated phosphoric acid, and conductivity water. The electro-etching was accomplished by applying 18 volts D.-C. to the cathode element. In this process, the etching passivates; that is, a large pulse of current of about 50 amps. amplitude suddenly flows through the cathode element when it is dipped into the solution. But quickly, a surface coating is formed on the cathode which prevents the further flow of high current. The sudden drop of current to about 2 amps. Indicated that passivation had occurred. This coating gave the cathode a yellowish caste. Again, the cathode elements were cleaned by washing with conductivity water.

Examination under a 300-power microscope showed that the surface had been partially consumed in the process, leaving a mammillary surface consisting of an irregular pattern of almost hemispheroidal protrusions or mounds. By comparing the spacing of the protrusions with the diameter of the wire prior to etching, it was estimated that the spacing between centers of the protrusions was about 0.45 mil. Examination of the boundary of the wire indicated that the depths of the channels formed between adjacent mounds was about 0.2 mil. The surfaces of the individual mounds generally appeared frosted. A photomicrograph of part of such a screen is shown as FIG. 9.

Results obtained with an electrolytic cell employing cathode elements so formed are represented in graph G4. Here, it will be noted that a cell of greater sensitivity and greater degree of linearity was obtained than the cells of Examples 1 and 2.

The passivated screen possessed a yellowish tint. When this screen was cleaned by heating to 500° C., the screen became silvery, but the protuberances retained the same coarsely etched appearance and spacing. A screen so cleaned had about the same linearity characteristic as that bearing the yellow passivation coating, but responded to a change in gas composition more readily. Apparently, the passivated coating is removed by heating, thus permitting the catalytic reactivity to proceed more rapidly. This may be explained on the ground that the passivated coating acts as a diffusion barrier to oxygen and to hydroxyl ions.

EXAMPLE 5

In this case, too, the cathode elements were heated, then electro-etched and then cleaned. In this case, however, the electro-etching was accomplished with an aqueous solution containing 25% potassium hydroxide by weight. In this case, passivation did not occur. Since in this case, the electro-etching can completely destroy the cathode in a few minutes, the process must be accurately timed. In this particular case, the electro-etching was carried out at 150 amps. for a period of 30 seconds with an applied potential of 18 volts.

In the case of the potassium hydroxide solution, a black deposit, which is believed to be silver oxide ($Ag_2O$), was formed on the surface of the silver screen. To clean, the screen was submerged in concentrated sulphuric acid until the screen was visibly free of such black deposit. Thereupon, the screen was washed in conductivity water.

In this case, too, the resultant cathode element possessed a mammillary surface. In this particular case, the protuberance spacing was about 0.3 mil and the depth of the valleys between the mounds was about 0.1 mil. In this case, too, the mounds had a frosty appearance.

Results obtained with an electrolytic cell employing a cathode formed of such elements is represented in graph G5 of FIG. 6. Here, it will be noted that a cell of about the same sensitivity was obtained as in the case of Example 4, and that the response of this cell also exhibited a high degree of linearity.

General Discussion of Processing and Results

In all of the examples described, the heating of the cathode element was accomplished by placing the cathode element on a sheet of clean stainless steel, heated red-hot, and leaving it there for a period of about ten to fifteen seconds. Such heating volatilizes silver chloride and other silver compounds that may be present, since all common silver compounds remain solid only below about 500° C. In all cases, the screen was permitted to cool to room temperature before subjecting it to any further treatment or use. The electro-etching was performed by placing the screen elements, one at a time, in the electro-etching bath in a one-liter beaker.

In all of the electrochemical polishing and etching processes referred to, tweezers equipped with silver tips were employed for supporting the cathode elements while being treated. These tweezers were connected to the positive pole of an 18-volt wet cell through an ammeter, so that the tweezers and cathode element acted as an anode during the electrochemical etching process. A cathode composed of copper was permanently mounted in the electro-etching bath. Such a cathode typically was in the form of a copper sheet having a length of about eight inches (8") and a height of about three inches (3") bent into a U-shape, so as to surround the main body of the electro-etching bath in the beaker. In all cases, the screen was swished back and forth in the etchant while current was flowing. Such swishing prevented gas-streaking of the screen and facilitated uniform etching of the entire surface of the screen.

For best results, with the potassium hydroxide solution, it was found that it was necessary to clean the beaker thoroughly before etching, strong chromic acid cleaning being suitable. Unless this was done, it was found that many of the cells produced failed to attain the high degree of linearity represented by graph G5. In some cases where unsatisfactory results were obtained by means of electro-etching with the potassium hydroxide bath, the linearity, sensitivity, and uniformity of results could be greatly improved by heating the screen element again after the etching process was completed. Such heating removed contaminants, the presence of which accounts for such unsatisfactory results.

It will be noted that the screen of FIG. 8 has been largely consumed by the nitric acid. This photomicrograph indicates that even extensive acid etching does not produce the coarse etching obtained by electro-etching.

A number of tests have been made to examine cathode elements formed in various ways to determine to what extent the surfaces are covered with electrolyte when one edge of the electrode element is immersed in electrolyte.

When testing the acid-etched screen of Example 4, it is relatively easy to see that the entire screen becomes coated with electrolyte when the screen is in contact with an aqueous solution of potassium hydroxide. The portions of the screen which are contacted by the electrolyte change color slightly, becoming more tannish or brownish. That the entire screen has changed color due to the presence of the potassium hydroxide solution becomes evident from a comparison of a dry screen with one which is in contact with the solution. That the entire screen was covered by electrolyte could also be determined by visual observation by examining the screen surface for specular reflections characteristic of reflection from a liquid surface. However, observations of the latter type require considerable practice, patience, and skill.

Observations made on some electrode elements formed by the process of Example 5, but not exhibiting the high degree of linearity and high sensitivity of graph G5, proved to be very interesting. The response of a cell employing such a screen is illustrated by graph G6 of FIG. 6. Inspection of such a screen while it is in contact with a potassium hydroxide solution and exposed to the atmosphere reveals that there are oval-shaped bare spots on the outer parts of the screen, where one wire crosses another and protrudes outwardly therefrom. This result is particularly striking when a small quantity of coloring material, such as phenolphthalein, is added to a solution of potassium hydroxide of a concentration suitable for producing a colored solution.

A photomicrograph illustrating a group of such oval patterns is shown in FIG. 11. The three oval patterns shown there were very bright when viewed with the eye through a microscope compared with the remainder of the screen, which was covered with the colored solution.

When a cathode element subject to producing such oval portions is cleaned by heating as described, and when the cathode element no longer manifests such oval portions when wet with electrolyte, the cathode element then manifests a high degree of linearity and a high degree of sensitivity, such as that represented by graph G5, and such oval areas are no longer formed. The screen could also be cleaned more slowly by letting it stand in potassium hydroxide for a long period, such as many hours or a few days.

It was found that such oval pattern could be produced by contacting the screen with the fingers. It thus appears that body oils rendered the screen hydrophobic, thus reducing the wettability of the screen. Thus, for best results, the screen should be hydrophilic, rather than hydrophobic. For this reason, once cathode elements are formed, they are mounted in the cells with the aid of tweezers and without being touched with the fingers.

As a result of this invention, an oxygen trace analyzer has been provided which has a greater sensitivity and a greater degree of linearity than oxygen trace analyzers heretofore available. This improvement is due to the enlargement of the channels that result from the reticulation of the surface of the cathode. As a result of the reticulation, the depth of the channels so provided is considerably greater than the thickness that the film would have if the surface were smooth or polished.

In view of the foregoing, it will be apparent that if the spacing between the ridges or mounds is too great, the electrolyte will not fill the valleys between them and form deeper channels than in the case of a smooth surface, but the film will conform to the surface of the electrode. Similarly, if the etching is too fine, such as when the surface is merely frosted, the depths of the channels formed are not much greater than the thickness that the film would have if the electrodes were smooth. Thus, broadly speaking, in accordance with this invention, the electrode surface is channelized to provide an electrolyte depth which increases the average thickness of the film many times compared with the thickness that the electrolyte would have on a smooth electrode. In the case of Examples 4 and 5, when the electrode is covered with the electrolyte, the average thickness of the electrolyte film is about 0.05 mil.

When metals other than silver are used, various etchants may be used that are adapted to the particular metal at hand. For example, with a copper-wire screen the electro-etching bath of Example 4 has proved satisfactory. A cell using such a copper cathode exhibits a high degree of linearity, though it does not recover from exposure to large concentrations of oxygen as rapidly as one using a silver cathode.

With cells employing folded-screen reticulated cathodes in accordance with this invention, electrolyte not only fills the aperture of the screen and the space between the two layers of the screen, but also the channels between the microscopic ridges or mounds, thus providing larger channels of communication of freely movable liquid through which the hydroxyl ions can flow more freely than otherwise.

The thick films so formed communicate with small pools or bodies of liquid electrolyte that fill the apertures between the wires. These small pools of liquid electrolyte are formed by virtue of the fact that liquid is supported between the wires and by the wires themselves. These small pools of electrolyte thus feed the channelized films on the adjacent wires and thus rapidly replenish the supply of water required to replace the hydroxyl ions flowing to the cathode. As a result, an electrolytic cell is formed which exhibits great sensitivity and greater linearity.

The provision of channels on the surface of the electrode thus increases the magnitude of the ion current at which ion current saturation can occur. As a result, the range of oxygen concentration over which linearity of a given degree can be achieved is greately increased. As a result, with an electrolytic cell constructed in accordance with this invention, it is possible not only to make accurate measurements of oxygen concentration when the oxygen concentration is as low as ten parts per million, but also when the oxygen concentration is as great as ten thousand parts per million.

While the invention has been described with particular reference to the detection of oxygen by means of an electrochemical cell employing a silver cathode in contact with an aqueous solution of potassium hydroxide, it will be understood that the invention is also applicable to the measurement of other gases with cathodes composed of other material and with other electrolytes. For example, the cathodes may be composed of silver, copper, platinum, gold, nickel, iridium, and other metals behaving similarly in gas-testing devices of the type described. Furthermore, though the invention is especially applicable to a cathode which is completely submerged in the electrolyte during the measurements, it is also applicable to a cathode such as that disclosd in the Hersch Patent No. 2,805,191. Even though a three-phase boundary is present in such a cell, the fact that deeper channels are employed to provide communication between the three-phase boundaries and the main body of the mother electrolyte makes it possible to extend the linearity range of the instrument. Furthermore, even though the invention has been described only with reference to a cathode in the form of a screen, it is also applicable to cathodes of other forms, such as wire cathodes wound on porous bodies and to sheet cathodes, since in all cases the channels of communication between the parts of the film of minimal thickness and the mother electrolyte are increased.

It is therefore to be understood that the invention is not limited to the particular forms thereof which have been specifically described herein, but that many changes may be made in the composition of the electrolyte and of the electrode surfaces, in the gases to be tested, and in the shape and construction and size of the electrodes, all within the scope of the invention as defined by the claims which follow.

The invention claimed is:

1. A cell for the determination of the concentration of an oxidizing gas in a gaseous mixture comprising:
   an anode and a cathode mounted in fixed positions in a container for a body of electrolyte establishing an electrically conductive fluid path joining said anode and said cathode;
   at least a part of said cathode being submerged in a film of electrolyte, the part of said cathode so submerged having a surface that is covered by a multiplicity of microsopic protuberances that are separated by a net work of interconnected channels that provide liquid communication between said film of electrolyte and said body of electrolyte, said protuberances having an average intercenter spacing within the range of about 0.1 to about 0.6 mil. the material of said cathode and the composition of said electrolyte being such that said cathode is not consumed in said electrolyte in the presence of oxygen.

2. A cell for the determination of the concentration of an oxidizing gas in a gaseous mixture comprising:
   an anode and a cathode mounted in fixed positions in a container for a body of electrolyte establishing an electrically conductive fluid path joining said anode and said cathode;
   at least a portion of the cathode stands above the main body of said electrolyte, all of said portion of said cathode that would otherwise be exposed to gas being submerged in a film of electrolyte whereby said film prevents direct contact of said cathode with said gas mixture and oxygen in said gas mixture reaches said cathode only by diffusion through said electrolyte, all of said cathode covered by said film having a surface that is covered by a multiplicity of microscopic protuberances that are separated by a network of interconnected channels that provide liquid communication between said film of electrolyte and said body of electrolyte, said protuberances having an average intercenter spacing within the range of about 0.1 to about 0.6 mil. the material of said cathode and the composition of said electrolyte being such that said cathode is not consumed in said electrolyte in the presence of oxygen.

3. A cell as defined in claim 1 in which said cathode is formed of a metal chosen from the group consisting of silver, copper, platinum, gold, nickel and iridium.

4. A cell as defined in claim 1 in which said protuberances have an average inter-center spacing of about 0.4 mil.

5. A cell as defined in claim 1 in which said cathode is formed of a metal chosen from the group consisting of silver, copper, platinum, gold, nickel and iridium, and presenting a surface characterized by a multiplicity of microscopic protuberances separated by interconnected channels, and in which said protuberances have an average inter-center spacing within the range of about 0.1 to about 0.6 mil.

6. A cell as defined in claim 2 in which the surface of said cathode is hydrophilic.

7. A system as defined in claim 1 in which a film of electrolyte covers the entire cathode otherwise exposed to gas, whereby said film prevents direct contact of said cathode with said gas mixture and oxygen in said gas mixture reaches said cathode only by diffusion through said electrolyte.

8. A system for measuring concentration of oxygen in a gas mixture comprising a cell as defined in claim 1 in which the individual microscopic protuberances have a frosty appearance under the miscroscope.

9. A cell as defined in claim 2 in which said cathode is formed of a metal chosen from the group consisting of silver, copper, platinum, gold, nickel, and iridium, and presenting a surface characterized by a multiplicity of microscopic protuberances separated by interconnected channels, and in which said protuberances have an average inter-center spacing within the range of about 0.1 to about 0.6 mil., and wherein said protuberances have a frosty appearance under a microscope.

10. In the combination of a cell with means for flowing a gas containing oxygen through said cell, the improvement wherein said cell comprises an anode and a cathode mounted in fixed positions therein and containing a body of liquid electrolyte that establishes an electrically conductive fluid path joining said anode and said cathode with at least a portion of said cathode standing above the main level of said body of electrolyte, whereby said film prevents direct contact of said cathode by said gas mixture and whereby oxygen in said mixture reaches said cathode only by diffusion through said electrolyte, all of said cathode that is covered by said film having a surface that is provided with a multiplicity of microscopic protuberances that are separated by a network of interconnected channels that provide liquid communication between said film of electrolyte and said body of electrolyte, said protuberances having an average intercenter spacing within the range of about 0.1 to about 0.6 mil. the material of said cathode and the composition of said electrolyte being such that said cathode is not consumed in said electrolyte in the presence of oxygen.

11. A cell as defined in claim 10 in which said protuberances have an average inter-center spacing of about 0.4 mils.

12. A cell for the determination of the concentration of an oxidizing gas in a gaseous mixture comprising:
    an anode;
    a cathode; and
    a body of electrolyte establishing an electrically conductive fluid path joining said anode and said cathode; at least a portion of the cathode standing above the main body of said electrolyte, all of said portion of said cathode that would otherwise be exposed to gas being submerged in a film of electrolyte whereby said film prevents direct contact of said cathode with said gas mixture and oxygen in said gas mixture reaches said cathode only by diffusion through said electrolyte, all of said cathode covered by said film having a surface composed of a multiplicity of microscopic protuberances that have an average inter-center spacing within the range of about 0.1 to about 0.6 mil. and are separated by a network of interconnected channels that provide liquid communication between said film of electrolyte and said body of electrolyte, the material of said cathode and the composition of said electrolyte being such that said cathode is not consumed in said electrolyte in the presence of oxygen.

13. In a cell for the determination of the concentration of an oxidizing gas in a gaseous mixture as defined in claim 12;
    the improvement wherein said cathode is provided with a hydrophilic surface and in which the average inter-center spacing of said microscopic protuberances is about 0.4 mil.

References Cited in the file of this patent
UNITED STATES PATENTS

| | | |
|---|---|---|
| 2,052,962 | Booe | Sept. 1, 1936 |
| 2,278,248 | Darrah | Mar. 31, 1942 |
| 2,462,197 | Jernstedt | Feb. 22, 1949 |
| 2,651,612 | Haller | Sept. 8, 1953 |
| 2,805,191 | Hersch | Sept. 3, 1957 |
| 3,003,932 | Frey et al. | Oct. 10, 1961 |
| 3,005,758 | Spracklen et al. | Oct. 24, 1961 |

OTHER REFERENCES

Kolthoff: "pH and Electro Titrations," 1948, John Wiley & Sons, Inc., pages 87–91.